Figure 1:
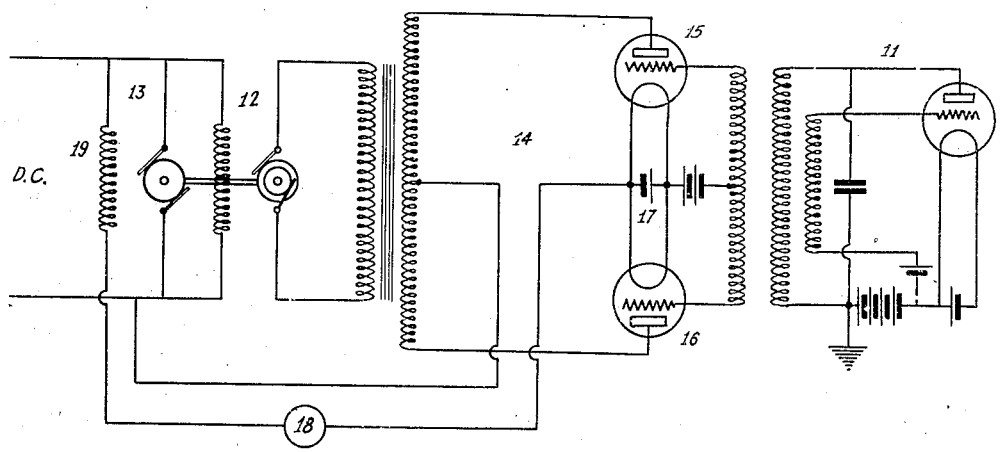

March 12, 1935.  E. S. PURINGTON  1,994,230

SYNCHRONIZING ARRANGEMENT

Filed Oct. 20, 1928

INVENTOR
ELLISON S. PURINGTON
BY Ira J. Adams
ATTORNEY

Patented Mar. 12, 1935

1,994,230

UNITED STATES PATENT OFFICE 1,994,230

SYNCHRONIZING ARRANGMENT

Ellison S. Purington, Gloucester, Mass., assignor to John Hays Hammond, Jr.

Application October 20, 1928, Serial No. 318,713

4 Claims. (Cl. 172—293)

One of the objects of this invention is to provide a method of controlling a rotating shaft in accordance with periodic changes of an electric current.

Another object is to provide a quick acting electrical brake whereby the braking torque on a rotating device may be changed by the application of a small amount of electrical power.

A further object is to control the output of a mechanical type alternating current generator to be in electrical synchronism with an electrical oscillation.

A still further object is to provide a smooth and steady motion for driving moving parts of mechanical and electrical devices.

Other objects will become apparent from the following description taken in connection with the accompanying drawing. In the particular application shown in this specification for the purpose of illustration, the controlling current is derived from a vacuum tube oscillator, and it is desired that the rotating shaft rotate in an extremely smooth and constant manner in order to provide the driving mechanism for picture transmission and reception, television synchronization and similar uses. In this application, similar driving mechanisms may be used at the transmitter and at the receiver, with slight adjustments at the receiver such that slight corrections may be made from time to time by manual control, if required.

The following elements are required to comprise the apparatus of my invention,

1. A controlling device. This serves to determine and control the speed of mechanical motion. In practice it may be a vacuum tube oscillator system comprising condensers and coils arranged in the usual and well known manner. It may comprise tuning forks and other electrodynamical devices. The controlling device may be at a distance, and the control may operate through use of a transmission line or a radio channel. A simple key circuit for throwing direct voltage into a control circuit may be the control device, by manual operation, but the chief applications will involve automatic control from a periodically varying electrical source. It is to be understood, however, that the nature of the source of electric oscillations to be the controlling element of the mechanical rotation is not limited to those named, but may be any source of constant frequency electric variations. It is understood also that any well known and readily constructible means may be provided for varying the frequency of the oscillating current for purposes of adjustment.

2. An alternating current generator of the mechanical type, with suitable motive power for driving, such as an A. C. or D. C. motor, air turbines, spring motor, etc. The type of drive for the generator is not limited in this invention, nor is the type of generator used limited. It is merely required that the generator periodicity correspond to a mechanical speed of motion. It is understood that the motor may be further used to operate other devices, such as a scanning disk used in television transmission. It is further understood that the mechanical type A. C. generator may be used to drive electrical devices other than the electrical discharge system.

3. An electrical discharge system with accompanying circuits adapted to be energized from the A. C. mechanical type generator, and also with circuits adapted to be energized by the control device, such that the power drawn from the mechanical type generator may be varied. This discharge system may be based on the use of the three electrode vacuum tube of the usual type.

Figure 2:
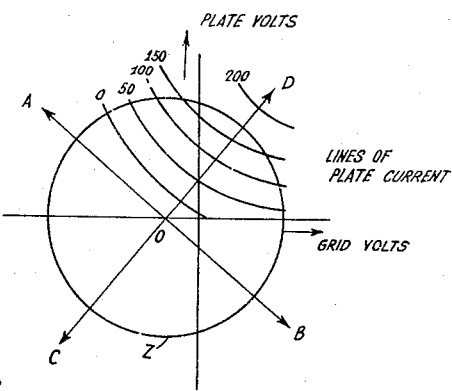

Having briefly described my invention, attention is invited to the accompanying drawing, wherein, Fig. 1 represents a general layout of a system constructed in accordance with my invention; and, Fig. 2 is a diagram showing the relationship between grid and plate voltages, and plate current, at varying phase displacements.

Figure 3:
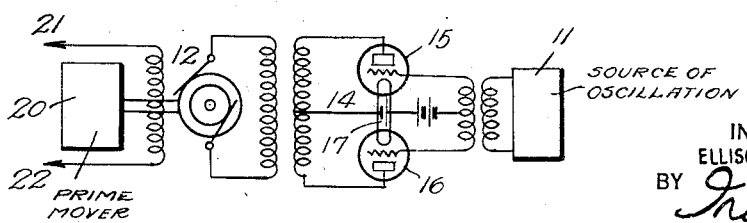

Figure 3 represents a general layout of a system constructed in accordance with the invention in which the prime mover is shown generally and the control is obtained by the load characteristics of the electronic system.

Having thus briefly described the drawing, attention is now particularly invited to Fig. 1, wherein the controlling device is an alternating current source which is to be matched in periodicity by a corresponding mechanical rotation. This source is a vacuum tube oscillating circuit arranged in a well known manner as shown at 11. Special care should be taken in design so that the oscillations produced by this generator are of a very constant frequency, independent of slight changes of plate and grid voltages, temperature, and loading. Further this may be arranged so as to provide manual control of the frequency for adjustment purposes by varying the capacity of the condenser or the controlling inductance such as by means of a variometer. If desired the frequency of this circuit may be automatically controlled by some time standard such as a pendulum clock. Furthermore a crystal may be used to control the frequency of the oscillator to a very great degree of accuracy.

The mechanical type A. C. generator is shown at 12, and this is adapted to be driven by a D. C. motor shown at 13. The generator may be a multiple pole machine, for example, with 8 cycles per revolution, in which case the frequency generated would be 500 cycles if the speed of rotation is 62½ revolutions per second. The generator frequency in operation is to match the vacuum tube oscillator frequency, so that the mechanical frequency of rotation 62½ cycles per second corresponds with the control frequency of 500 cycles per second.

The motor is direct coupled D. C. as shown, but it is understood that other suitable type of driving motor may be used. The shaft connecting the motor and generator is adapted to drive some device such as a drum, cylinder or disc of a television transmitter or receiver.

Comprising the electrical discharge system there is shown, at 14, in this instance, a push-pull vacuum tube circuit comprising the thermionic devices 15 and 16, the filaments of which are adapted to be supplied by the battery 17 in the usual and well known manner, and at 11 a vacuum tube oscillator inductively coupled into the grid circuits of the push-pull vacuum tubes. The output of the A. C. generator 12 is coupled to the plate circuit of the push-pull circuit 14. For making these couplings, any suitable transformers may be used. A suitable bias battery may be used in the grid circuit of the push-pull tubes.

The plate circuit is the circuit between the filaments and the center tap of the plate circuit transformer, as in the usual rectifier connection. In the present case, this circuit includes the D. C. meter 18 and the field winding 19 of motor 13. The use of a field winding is not essential to the invention since it is applicable only to D. C. motor drive while the invention is applicable to all types of motor drive. It is in some cases most satisfactory to operate with only the indicating meter, 18, in the output circuit connected between center tap of the transformer and the filaments, in which case the power rating of the brake is limited by heating of the tubes. For better design, an ohmic resistance such as a set of lamps in series may be connected in the output circuit, which will permit greatly increased power at higher voltage to be taken from the generator without exceeding the proper tube losses.

Operation of this system depends upon the fact that the loading of the A. C. generator changes with a change of relative phases of the voltages impressed into the plate circuits and grid circuits of the loading tubes.

In Figure 3 an alternating current source 11 is shown coupled to the input of a push-pull circuit including two thermionic devices 15 and 16. The output 14 of the push-pull arrangement is coupled to the output of generator 12 in the same manner as shown in Figure 1. Generator 12 is driven by a prime mover 20. The prime mover 20 may be of any conventional type, such for instance, as a steam engine or turbine, alternating current motor, air turbine and the like. Leads 21 and 22 are connected to any suitable current source to provide the necessary field for generator 12 in the customary manner. The operation of the device shown in Figure 3 depends entirely upon the fact that the loading of the alternating current generator is affected with a change of relative phase of the voltages impressed into the plate circuits and grid circuits of the loading push-pull arrangement.

The Fig. 2 is an operational diagram illustrating the action of the tube 15, for instance, in the simple case with no impedance in the plate circuit external to the tube. The abscissas represent grid voltage and the ordinates represent plate voltage. The characteristics of the tube with respect to plate current are indicated by the lines of instantaneous plate current marked zero 50, 150 and 200 representing milliamperes. During the cyclic operation of the tube 15 of Fig. 1 with its plate voltage impressed from the generator 12 and its grid voltage impressed from the oscillator 11 it is obvious that a great variety of operational characteristics may be obtained. With the frequencies of the generator 12 and oscillator 11 the same, a line of operation will be had such as a line AB, a circle Z, the line CD or any other elliptical line of operation running between the limiting lines of operation AB and CD, the form of said line of operation depending upon the relative phases of the oscillations in the plate and grid circuits. The corresponding instantaneous value of the plate current will be that indicated by the lines of instantaneous plate current at any given instant depending upon the position of operation in the line of operation of the plate and grid voltage at any given instant and the average plate current will be the sum of the instantaneous plate currents. Thus, if the plate applied voltage is 180° out of phase with respect to the grid applied voltage so that the instantaneous plate voltage is maximum when the instantaneous grid voltage is minimum, point A on the diagram, then the average plate impedance is high with little or no power drawn through the generator. This corresponds with the line of operation AB of Fig. 2. However, if the generator gains a half cycle over the control current so that the plate and grid are simultaneously a maximum with zero degrees phase difference, the average plate impedance is low and large power is drawn through the generator. This corresponds with the line of operation CD with the peak current at D exceeding 200 milliamperes. Intermediate phases are represented by elliptical lines of operation and correspond to intermediate values of loading. The magnitude of loading or braking torque is indicated by the D. C. meter 18.

Stability of operation requires that the range of controlling torque due to the vacuum tube circuits must exceed fluctuations of mechanical driving torque of the motor and of mechanical loading torque due to driven devices other than the generator. In operation the motor drive is adjusted by means of rheostats until the generator frequency and controlling frequency match, with the meter indicating no beat action. Subsequently if there is any tendency of the generator to speed up due to more torque being applied from the motor, or less torque required by driven devices other than the generator, or less loading on the generator due to other circuits than the control circuit, then the corresponding phase shift of the plate voltage with respect to the grid voltage produces an additional braking torque which establishes equilibrium again with but slight permanent phase shift. Similarly any torque action tending to slow down the generator will be compensated for by a weakening of the braking torque.

When the rectified output current is used to control the motor field, care must be taken to have connections proper such that the braking action and the field control action are additive in effects. In case of excessive inductance of the field winding, it is desirable to use condensers or resistors across the output in such a manner that the braking action may be rapid, although the field action may be delayed.

Thus in the operation of this device, the rotating generator and vacuum tube plate constitute an electrical brake, with the amount of the braking torque determined by the relative phases of the vacuum tube oscillations and the mechanical generator oscillations. In this particular application the control is made automatic so as to hold the rotating shaft at a constant speed corresponding with the frequency of the alternating current source.

Other methods of control such as manual control of braking, by means of key and bias battery circuits, or use of low frequency control voltage to cause the generator frequency to hunt between high and low values are also within the scope of this invention.

Having thus described my invention, it is to be understood that I am not to be limited to the specific embodiments shown and described for the purposes of illustration, but I am entitled to all uses which fall within the scope of my invention as defined by the appended claims.

I claim:

1. The method of maintaining the speed of rotation of a rotary element at a desired value which comprises generating an alternating current having a frequency proportional to the speed of rotation of said element, independently generating a controlling alternating current, comparing the phases of the two currents, and loading the source of the first mentioned generated alternating current in varying degrees in correspondence with the phase differences between said two generated currents.

2. In a synchronizing system, an alternator for generating electrical energy of a frequency proportionate to the speed of rotation thereof, an independent source of controlling frequencies, a thermionic device having its input circuit directly associated with said source of controlling frequencies and its output circuit directly associated with the alternator, said thermionic device forming a variable load circuit for said alternator having a load characteristic which increases as the output direct current thereof increases, whereby the load upon the alternator is varied in proportion to the phase displacement of each of the electrical frequencies.

3. In a synchronizing system, an alternator for producing electrical energy of a frequency proportionate to the speed of rotation thereof, an independent source of controlling frequency, a thermionic relay having its input circuit coupled with said source of controlling frequency and its output circuit coupled with the alternator, said thermionic relay forming a combined frequency comparing circuit and a variable load circuit said latter being effective directly upon said alternator to a degree sufficient to control its speed of rotation, whereby the load upon the alternator is varied in proportion to the phase displacement of each of the electrical frequencies.

4. In a synchronizing system, an alternator for generating electrical energy of a frequency proportionate to the speed of rotation thereof, an independent source of controlling frequency energy, a pair of thermionic devices forming a push-pull circuit having its input circuit directly associated with said source of controlling frequency energy and its output circuit directly associated with the alternator, said push-pull circuit forming a variable load circuit for said alternator and having a load characteristic which increases as the output direct current thereof increases, whereby the load upon the alternator is varied in proportion to the phase displacement of each of the electrical frequencies.

ELLISON S. PURINGTON.